US007485998B2

(12) United States Patent
Gorlt

(10) Patent No.: US 7,485,998 B2
(45) Date of Patent: Feb. 3, 2009

(54) COMMUTATOR

(75) Inventor: Wilfried Gorlt, Filderstadt (DE)

(73) Assignee: Johnson Electric S.A., La Chaux-de-Fonds (CH)

( * ) Notice: Subject to any disclaimer, the term of this patent is extended or adjusted under 35 U.S.C. 154(b) by 659 days.

(21) Appl. No.: 10/438,825

(22) Filed: May 16, 2003

(65) Prior Publication Data

US 2006/0087195 A1 Apr. 27, 2006

(30) Foreign Application Priority Data

May 18, 2002 (GB) ................................ 0211441.1

(51) Int. Cl.
*H02K 13/04* (2006.01)

(52) U.S. Cl. ...................................................... 310/237

(58) Field of Classification Search ................. 310/233, 310/234, 237
See application file for complete search history.

(56) References Cited

U.S. PATENT DOCUMENTS 5,826,324 A * 10/1998 Abe et al. ..................... 29/597
5,925,962 A 7/1999 Kobman et al.
6,222,298 B1 * 4/2001 Saito et al. .................. 310/233
6,236,136 B1 * 5/2001 Hockaday et al. ........... 310/233
6,259,183 B1 * 7/2001 Hotta et al. ................. 310/233
6,667,565 B2 * 12/2003 Strobl ........................ 310/237

FOREIGN PATENT DOCUMENTS

EP 0 583 892 A2 2/1994
EP 1 003 269 A1 5/2000
GB 0577091 A 5/1944
GB 2038565 A 7/1980

* cited by examiner

*Primary Examiner*—Nguyen N Hanh
(74) *Attorney, Agent, or Firm*—Birch, Stewart, Kolasch & Birch, LLP

(57) ABSTRACT

A commutator comprises a commutator base of insulating material, a plurality of commutator terminals, each of which has a terminal portion and a contact portion, and a plurality of carbon segments formed on the base and over the contact portions, respectively, of the terminal. Each carbon segment has an inner portion of molded (unsintered) graphite material adjacent to the base and one or more outer exposed portions, containing or formed of sintered graphite.

10 Claims, 6 Drawing Sheets

COMMUTATOR

BACKGROUND OF THE INVENTION

1. Field of the Invention

This invention relates to a commutator, and more particularly to a carbon segment commutator for an electric motor, and to a method of making such a commutator.

2. Description of background Art

Carbon segment commutators are known but suffer from the drawback that they have a fairly high interface resistance with brushes of a motor. The present invention seeks to reduce this interface resistance in order to enhance the performance of the motor.

SUMMARY OF THE INVENTION

According to the present invention there is provided a commutator comprising a commutator base of insulating material, a plurality of commutator terminals each of which comprises a terminal portion and a contact portion and a plurality of carbon segments formed on the base and over the contact portions, respectively, of the terminals wherein each carbon segment has an inner portion of molded graphite adjacent to the base and one or more outer exposed portions containing or formed of sintered graphite.

Preferably, each carbon segment comprises a first inner layer of molded graphite forming the inner portion and a second outer layer either of molded graphite containing sintered graphite particles or of sintered graphite, forming the outer portion.

Alternatively, each commutator segment comprises a layer of molded graphite forming the inner portion and one or more sintered graphite elements embedded in the first portion and forming the outer portions.

Preferably, the commutator is in the form of a planar commutator.

Preferably, the base has a rotational axis and front and rear surfaces extending, at least in part, transversely to the rotational axis and wherein the contact portion of each terminal extends through a respective first aperture in the base and is bent to lie against or in close proximity to the front surface of the base and the terminal portion of each terminal has a cutting edge for cutting insulation on a connector portion of a winding and a slot which, in use, straddles and grips the said connector portion.

Preferably, where each carbon segment comprises a fist inner layer of molded graphite forming the inner portion and a second outer layer of sintered graphite forming the outer portion, the second outer layers of the carbon segments define a disc split radially to form the individual commutator segments.

Preferably, where each commutator segment comprises a layer of molded graphite forming the inner portion and a plurality of sintered graphite elements embedded in the first portion and forming the outer portions, the sintered graphite elements are part circular and arranged concentrically with respect to the rotational axis of the base.

Alternatively, the commutator is in the form of a cylindrical commutator.

The present invention, in a second aspect thereof, also provides a method of making a planar commutator as described above, comprising the steps of:—

(a) forming a plurality of different diameter circular or annular elements of sintered graphite, or a disc of sintered graphite or of moldable graphite containing sintered graphite particles, then (b) connecting the terminals to the base, then (c) molding the sintered graphite elements or disc to the base with moldable graphite, and then (d) dividing the graphite into a plurality of commutator segments.

BRIEF DESCRIPTION OF THE DRAWINGS

The invention will now be more particularly described, by way of example only, with reference to the accompanying drawings, wherein:—

DETAILED DESCRIPTION OF EXEMPLARY EMBODIMENTS

Figure 1:
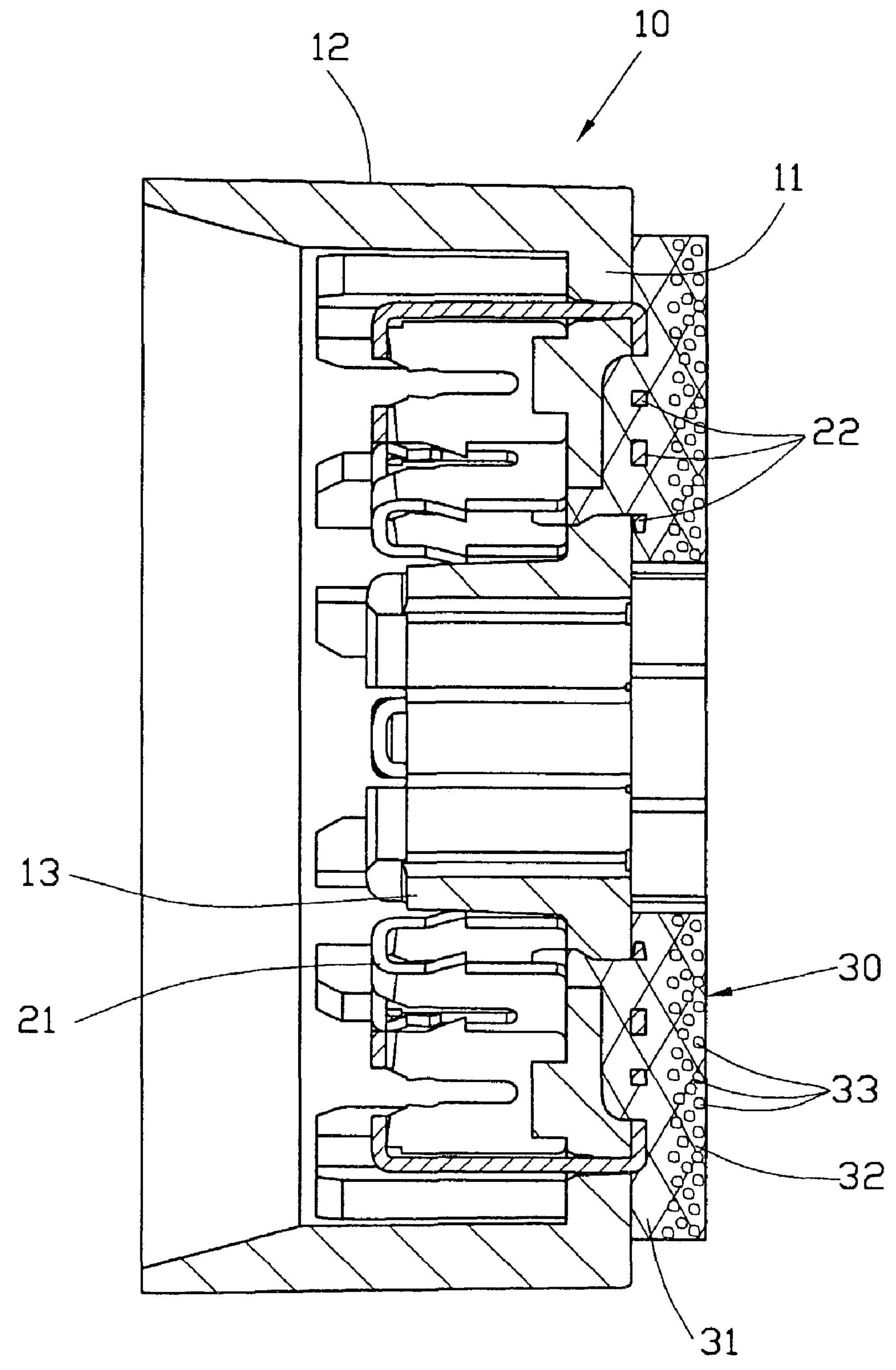
FIG. 1 is a sectional view of a first embodiment of a commutator according to the present invention.
Figure 2:
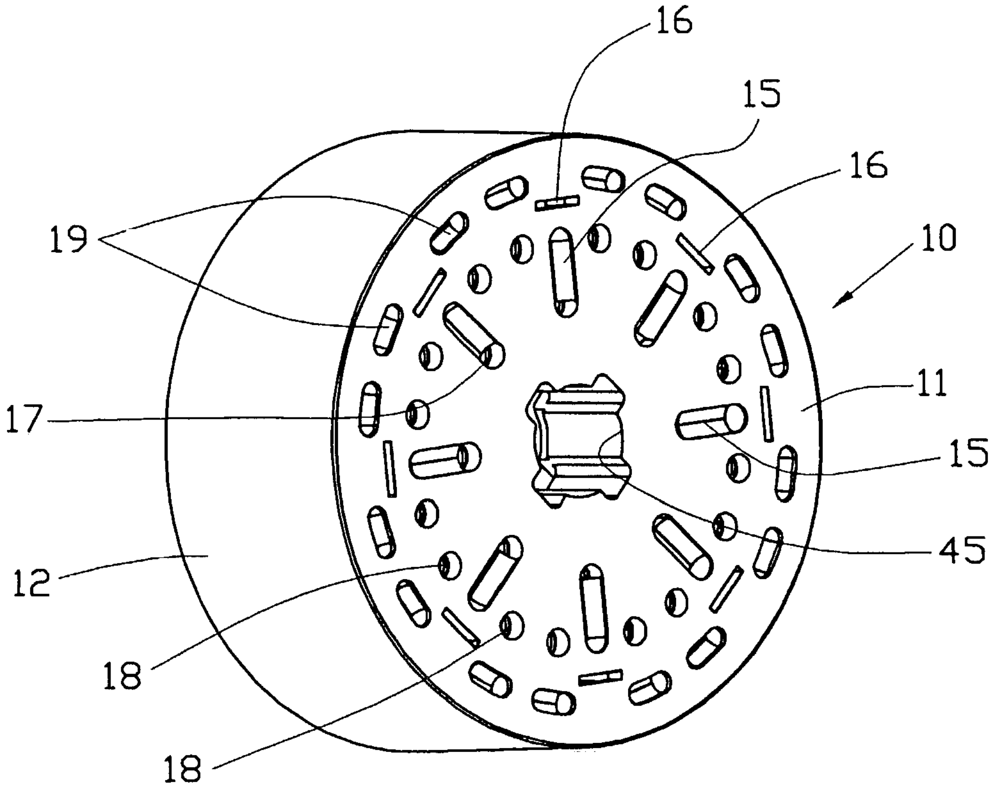
FIG. 2 is a perspective view from the front and one side of the base of the commutator shown in FIG. 1 on a reduced scale.
Figure 3:
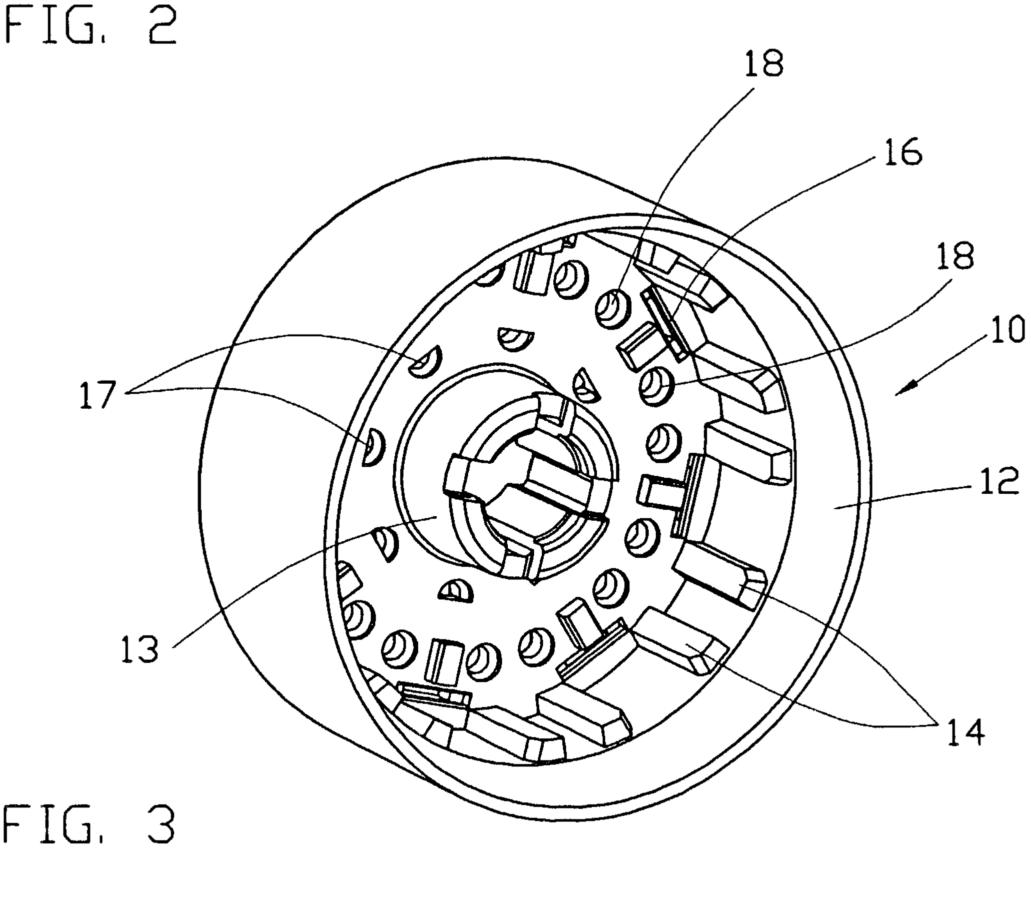
FIG. 3 is a perspective view from the rear and one side of the commutator base shown in FIG. 2 also on a reduced scale.
Figure 4:
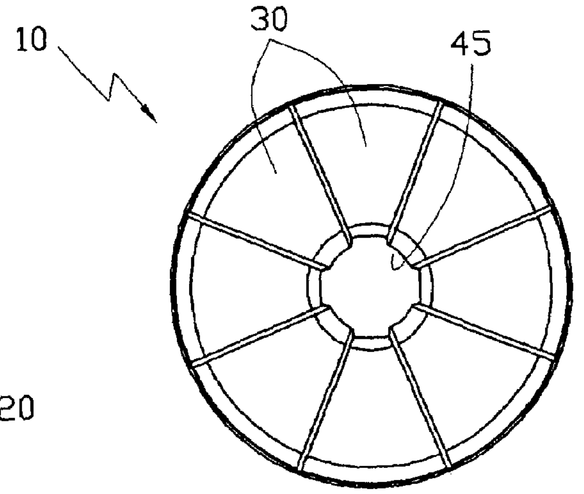
FIG. 4 is a plan view of the commutator also on a reduced scale.

The commutator shown in the drawings in intended for use with small electric motors, particularly permanent magnet dc motors. The commutator shown in FIGS. 1 to 8 is what is commonly referred to as a planar commutator for use with brushes which bear axially against planar contact surfaces of the commutator, instead of bearing radially as in the case of a cylindrical commutator. The invention is however equally applicable to cylindrical commutators as shown in FIG. 9 of the drawings.

Referring firstly to FIGS. 1 to 6, the commutator base 10 shown therein is of molded material and comprises a circular front wall 11 and a cylindrical skirt 12 extending rearwardly from the front wall 11. The base 10 also has a central boss 13 by which the base 10 can be fitted to an armature shaft (not shown).

A plurality of circumferentially spaced axially extending ribs 14 are provided on the inner surface of the skirt 12, for a purpose that will be explained later.

The front wall 11 has a central aperture 45 aligned with the boss 13, eight, equi-angularly spaced, elongate radially extending recesses 15 and an elongate, slit-like, aperture 16 radially aligned with each recess 15.

Each recess 15 communicates at its radially inner end with an aperture 17.

Each recess 15 is also associated with two apertures 18, one on either side of a respective recess 15 and adjacent its radially outer end.

The front wall 11 also has an outer ring of angularly spaced apart slots 19.

Figure 5:
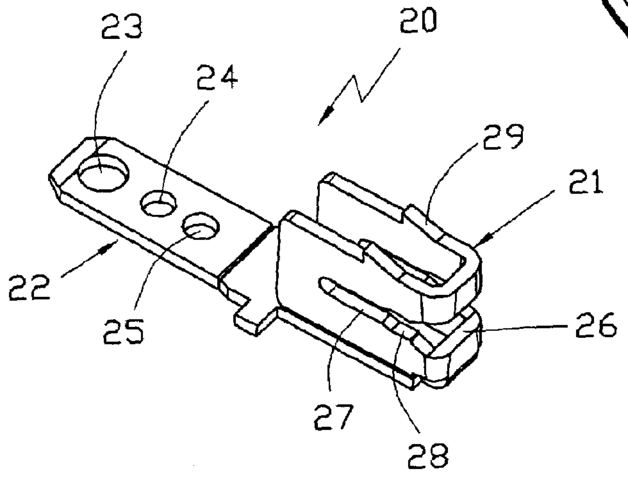
FIG. 5 is a perspective view of a commutator terminal.

The commutator terminal 20 shown in FIG. 5 comprises a terminal portion 21 and a contact portion 22. The contact portion 22 is in the form of a finger having three apertures 23, 24 and 25 therein. The terminal portion 21 is rectangular (as viewed in developed view) with its minor axis coincident with the longitudinal axis of the contact portion 22. The terminal portion 21 has a central cut out portion 26 which is symmetrical with respect to both the major and minor axes of the terminal portion 21. The cut out portion 26 reduces from its largest width at the center of the terminal portion 21 to two slots 27. Two cutters 28 project a short distance into each slot 27. These cutters 28 form sharp edges for cutting insulation on a connector portion of an armature winding. The terminal portion 21 also has two barbs 29 for a purpose which will become apparent later. To assemble the terminals 20 to the base 10, the fingers 22 are pressed through respective apertures 16 in the base 10 and the fingers 22 are then bent over respective recesses 15 to extend radially inwards.

Carbon commutator segments 30 are then formed on the front wall of the commutator base 10 over the fingers 22. This is achieved by hot pressing a disc of graphite material onto the front wall 11 and then cutting the disc into eight individual segments 30. The disc is formed of two layers 31 and 32 which have been cold pressed together. The layer 31 is of moldable graphite which includes a binder and the layer 32 is a layer of moldable graphite again containing a binder but also containing crushed sintered graphite particles 33 which typically have a minimum dimension of 0.15 mm and which may also typically have a maximum dimension of 0.25 mm. During the hot pressing, the binder is softened (possibly liquified) and this allows the layer 31 to flow under pressure through the apertures 23, 24 and 25 in the fingers 22 and into the recesses 15, into the slots 19 and through the apertures 17 and 18 to anchor the disc to the base 10. The eight outer layers 32 form a contact surface with brushes of a motor and the embedded particles 33, which are partially exposed, serve to reduce the interface resistance between brushes and segments and provide better current flow.

Figure 6:
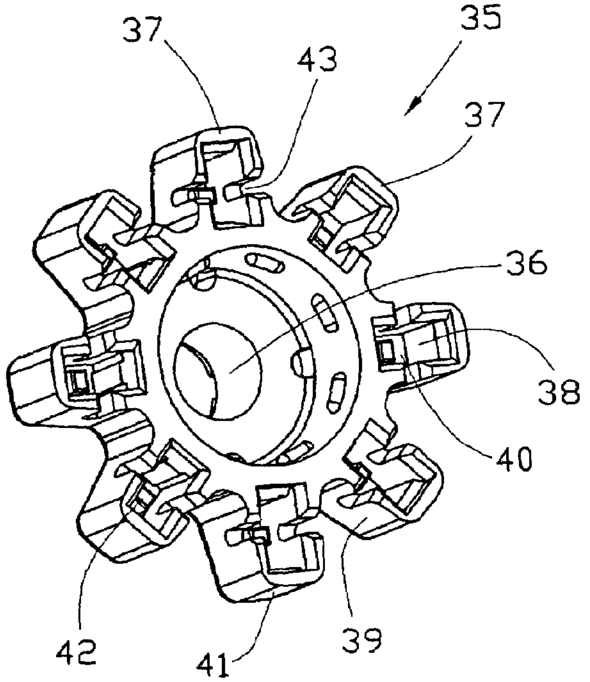
FIG. 6 is a perspective view of a housing for the terminals also on a reduced scale.

Referring now to FIG. 6, there is shown therein a housing 35 for the terminal portions 21 of the terminals 20. This housing 35 is of crown-like shape and has a central boss 36 for receiving the armature shaft and eight radially outwardly extending housing portions 37 equally spaced around the circumference of the boss 36. Each of the housing portions 37 defines a housing recess 38 and is used to effect connection between a respective portion of the armature winding and one of the terminal portions 21 of the terminals 20.

Each housing portion 37 has side walls 39, an end wall 40, and a cover 41. The side walls 39 are parallel to the longitudinal axis of the boss 36.

A stump 42 projects centrally from the internal surface of the end wall 40 and extends within the housing portion 37 for approximately half the length of the side walls 39. The stump 42 extends parallel with the longitudinal axis of the boss 36 and is only connected to the housing 35 by the end wall 40. Each side wall 39 has a slot 43 which extends parallel to the longitudinal axis of the boss 36, from the commutator end of the housing 35 for a length which terminates at the level of the free end of the stump 42. A portion of an armature winding can be passed through the slots 43 so that the winding portion rests on the end of the stump.

During assembly of the armature of an electric motor, the housing 35 is placed on the armature shaft. The lead wire of the armature winding is inserted into one of the housing portions 37 by laying the end of the wire in the slots 43 provided in the side walls 39. The wire is drawn back into the housing portion 37 until it rests against the stump 42. From this start, the first armature coil is wound. At the end of the first coil winding, the armature is indexed and the wire is laid in the same manner in the next housing portion 37 without breaking the continuity of the wire. This process is repeated until all coils have been wound and the tail end of the winding is then laid in the slots 43 of the first housing portion 37 and pushed back until it is adjacent to the lead end which was placed against the stump 42 at the beginning of the winding operation. The wire is then cut and the armature removed from the winding machine.

The housing 35 now has a winding portion comprising insulated wire laying in each of the housing portions 37. Each of the winding portions is under tension and is pulled tight against the respective stump 42. The commutator base 10, together with the terminals 20 and commutator segments 30, is then slid along the armature shaft so that the terminal portions 21 of the terminals enter respective housing portions 37 and the housing portions lie between the ribs 14. As each terminal portion 21 approaches a winding portion held in a housing portion 37, the slots 27 move over the wire. The cutters 28 sever the insulation on the wire which is deformed as the slots move over the wire. Intimate metal to metal contact is thereby provided between the wire and the terminal portions 20. The barbs 29 grip the cover 41 of the housing 35 and therefore retain the terminal portions 21 within the housing 35.

Figure 7:
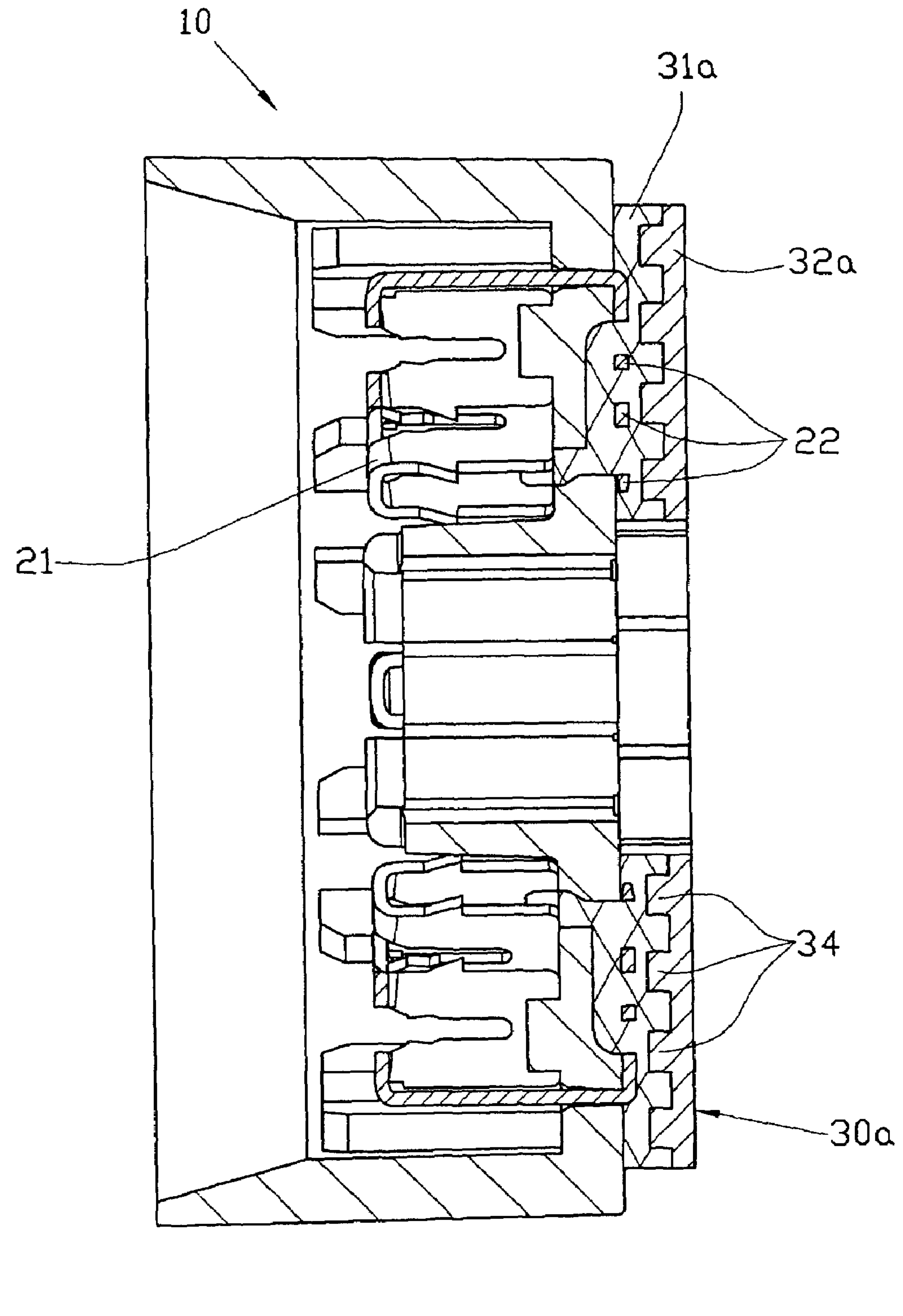
FIG. 7 is a sectional view of a second embodiment of a commutator according to the present invention.

The commutator shown in FIG. 7 is identical to that shown in FIG. 1 apart from the segments **30*a*. The segments 30*a* have two layers 31*a* and 32*a*. The layer 32*a* is a preformed layer of sintered graphite. This layer 32*a* is initially formed as a disc which is hot press molded to the base 10 with the layer 31*a*, which is moldable graphite, therebetween. As shown, the layer 32*a* preferably has a plurality of annular concentric ribs 34 on its rear face which project into the layer 31*a*. This helps key the layer 32*a* to the layer 31*a* and increases the flow area of current from one layer to the other. The layers 31*a* and 32*a* are then cut to form eight individual commutator segments 30*a***.

Figure 8:
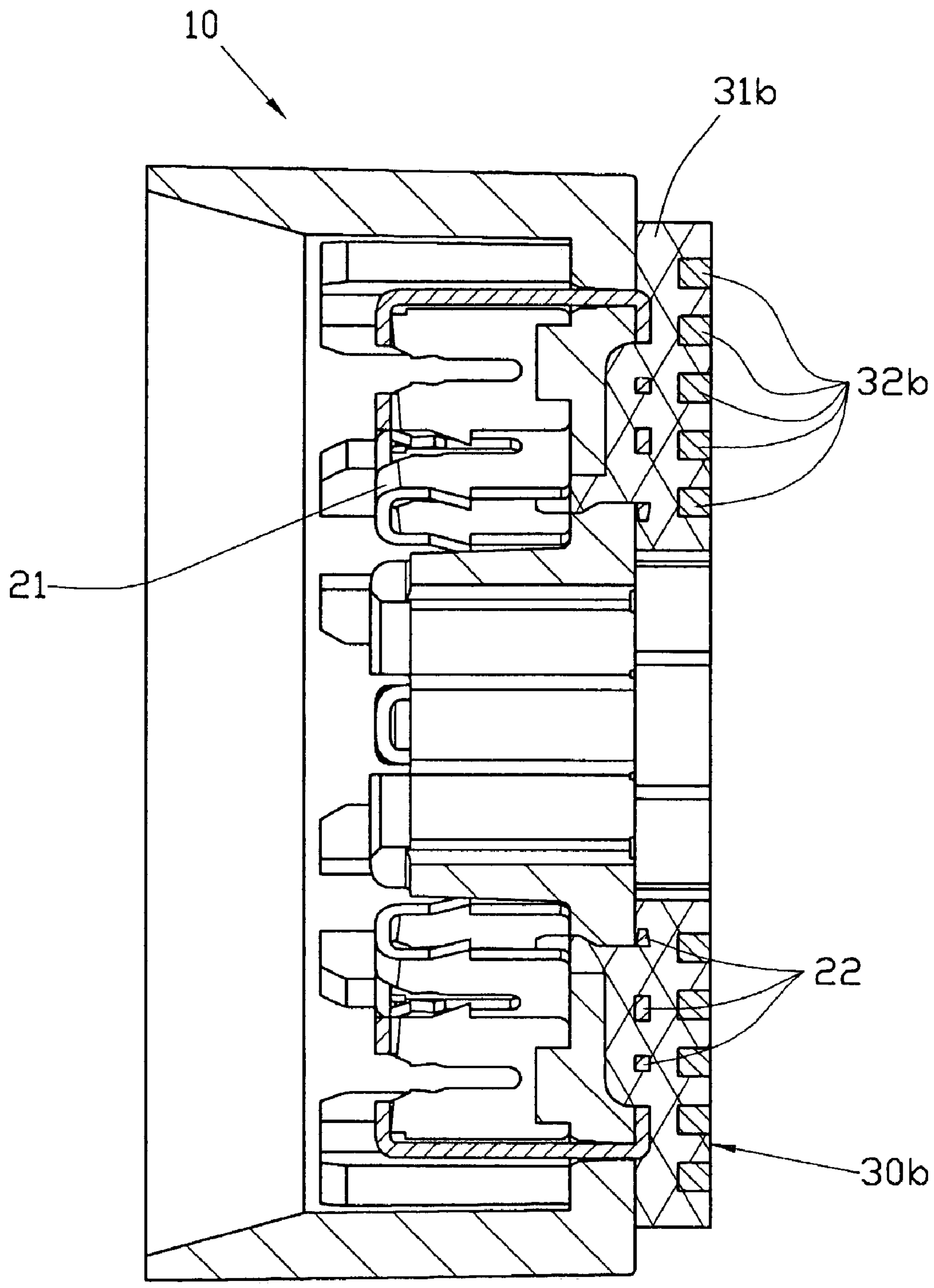
FIG. 8 is a sectional view of a third embodiment of a commutator according to the present invention.
Figure 9:
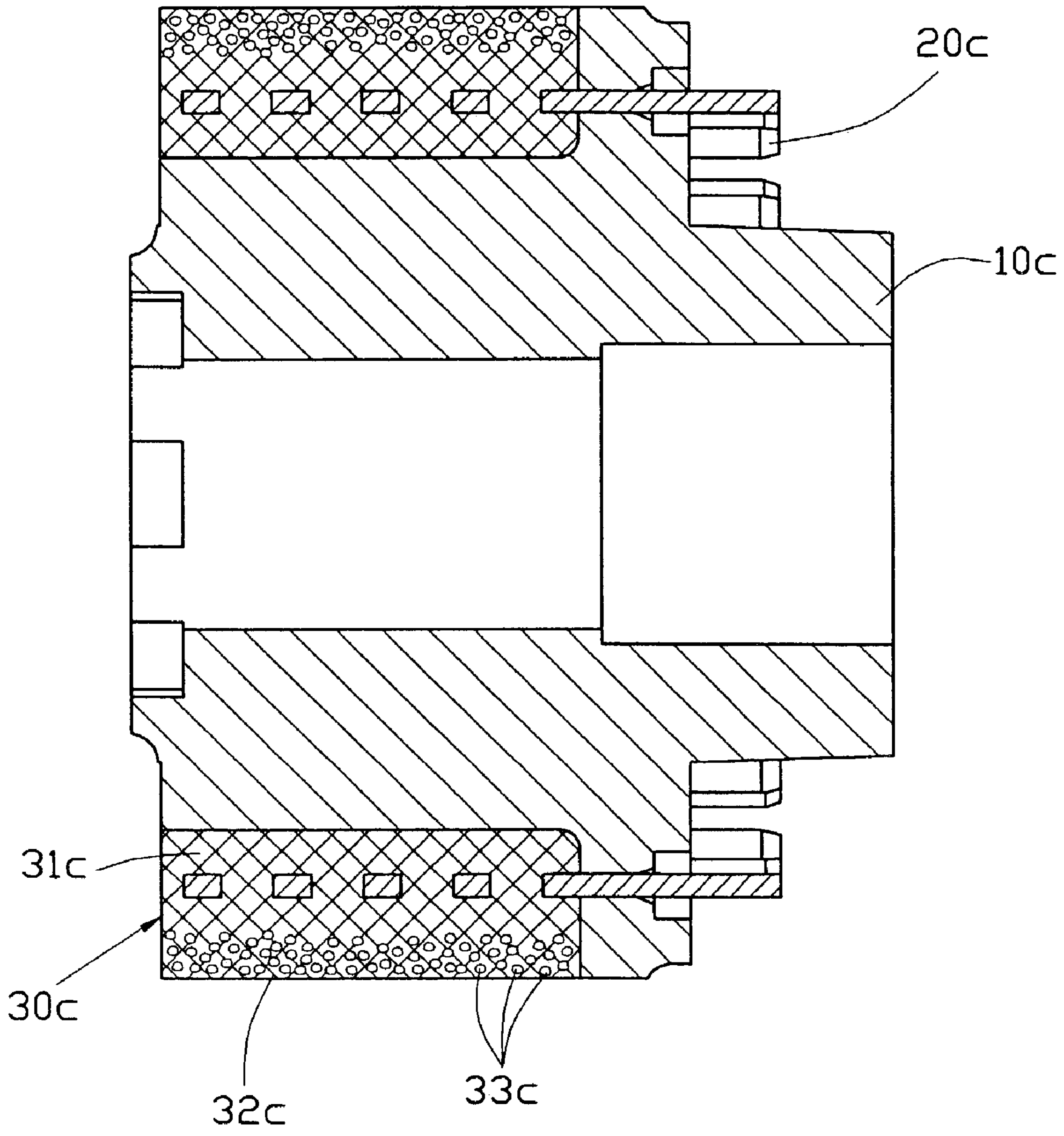
FIG. 9 is a sectional view of a fourth embodiment of a commutator according to the present invention.

The commutator shown in FIG. 8 is also identical to that shown in FIG. 1 apart from the commutator segments **30*b*. The segments 30*b* comprise a mass 31*b* of moldable graphite and at least one but typically five concentric circular elements 32*b* embedded in the outer surface of the mass 31*b*. The concentric circular elements 32*b* are preformed of sintered graphite and hot press molded to the base by the moldable graphite mass 31*b*. The mass 31*b*, together with the circular elements 32*b***, is then divided by cutting into eight individual segments.

The commutator shown in FIG. 9 is a cylindrical commutator as opposed to a planar commutator. The commutator comprises a base **10*c* terminals 20*c* and carbon commutator segments 30*c*. The segments 30*c* comprise two layers 31*c* and 32*c* which have been cold pressed together. The layer 31*c* is of molded graphite which includes a binder and the layer 32*c* is a layer of moldable graphite again containing a binder but also containing crushed sintered graphite particles 33*c* similar to the commutator shown in FIG. 1. The embedded particles 33*c*, like the particles 33 shown in FIG. 1**, are partially exposed and serve to reduce the interface resistance between brushes and segments and provide better current flow.

The commutators described above have terminal portions which make a mechanical connection with the winding of a motor. The commutator terminals could, alternatively, be provided with conventional tangs to which the armature winding can be connected by traditional methods such as by soldering, hot staking or crimping.

The embodiments described above are given by way of example only and various modifications will be apparent to persons skilled in the art without departing from the scope of the invention as defined in the appended claims.

What is claimed is:

1. A commutator comprising:

a commutator base of insulating material;

a plurality of commutator terminals each of which comprises a terminal portion and a contact portion; and a plurality of carbon segments formed on the base and over the contact portions, respectively, of the terminals, wherein each carbon segment has an inner portion of unsintered graphite adjacent to the base and at least one exposed outer portion containing or formed of sintered graphite.

2. The commutator as claimed in claim 1, wherein each carbon segment comprises a first inner layer of unsintered graphite forming the inner portion and a second outer layer of unsintered graphite containing sintered graphite particles forming the outer portion.

3. The commutator as claimed in claim 1, wherein each carbon segment comprises a first inner layer of unsintered graphite forming the inner portion and a second outer layer of sintered graphite forming the outer portion.

4. The commutator as claimed in claim 3, wherein the second outer layer includes parts which project into the first inner layer.

5. The commutator as claimed in claim 1, wherein each commutator segment comprises a layer of unsintered graphite forming the inner portion and at least one sintered graphite element embedded in the first portion and forming the outer portions.

6. The commutator as claimed in claim 1, wherein the commutator is in the form of a planar commutator.

7. The commutator as claimed in claim 6, wherein the base has a rotational axis and front and rear surfaces extending, at least in part, transversely to the rotational axis, and wherein the contact portion of each terminal extends through a respective first aperture in the base and is bent to lie against or in close proximity to the front surface of the base and the terminal portion of each terminal has a cutting edge for cutting insulation on a connector portion of a winding and a slot which, in use, straddles and grips the connector portion.

8. The commutator as claimed in claim 6, wherein each carbon segment comprises a first inner layer of unsintered graphite forming the inner portion and a second outer layer of sintered graphite forming the outer portion, and wherein the second outer layers of the carbon segments define a disc split radially to form the individual commutator segments.

9. The commutator as claimed in claim 6, wherein each commutator segment comprises a layer of unsintered graphite forming the inner portion and a plurality of sintered graphite elements embedded in the first portion and forming the outer portions, and wherein the sintered graphite elements are part circular and arranged concentrically with respect to the rotational axis of the base.

10. The commutator as claimed in claim 1, wherein the commutator is in the form of a cylindrical commutator.

* * * * *